United States Patent
Nielson

[15] 3,669,390
[45] June 13, 1972

[54] FISHING POLE HOLDER

[72] Inventor: Caldon M. Nielson, P.O. Box 481, Ephraim, Utah 84627

[22] Filed: May 14, 1970

[21] Appl. No.: 37,093

[52] U.S. Cl. .................................. 248/42, 248/44, 248/156
[51] Int. Cl. ............................................. A01h 97/10
[58] Field of Search ........................... 248/38–42, 44, 248/85, 87, 156; 43/17, 17.5, 21.2

[56] References Cited

UNITED STATES PATENTS

| | | | |
|---|---|---|---|
| 2,184,192 | 12/1939 | McCline et al. | 248/42 UX |
| 2,293,305 | 8/1942 | Oldham | 248/38 |
| 2,603,900 | 7/1952 | Kellett | 43/17 |
| 2,751,174 | 6/1956 | Parker | 248/42 |
| 3,010,239 | 11/1961 | Johnson | 43/17 |
| 3,306,560 | 2/1967 | Wheeler | 248/42 |
| 3,444,643 | 5/1969 | Dobbs | 248/39 |
| 3,519,234 | 7/1970 | Matson | 248/156 |

*Primary Examiner*—William H. Schultz

[57] ABSTRACT

A support for a fishing rod, the device comprising a unitary structure formed of configurated wire having stiff properties, the device including a horizontal arm having at its rear end a hook which is fitted over the rear end of the fishing pole handle, the forward end of the arm having a cradle upon which a forward portion of the fishing pole handle can rest, the forward portion of the arm being adjacent to a downwardly extending leg the lower end of the leg having means for being inserted either into the ground or support or else being fitted into a bracket mounted upon a boat, thus comprising a means for supporting a fishing pole.

3 Claims, 3 Drawing Figures

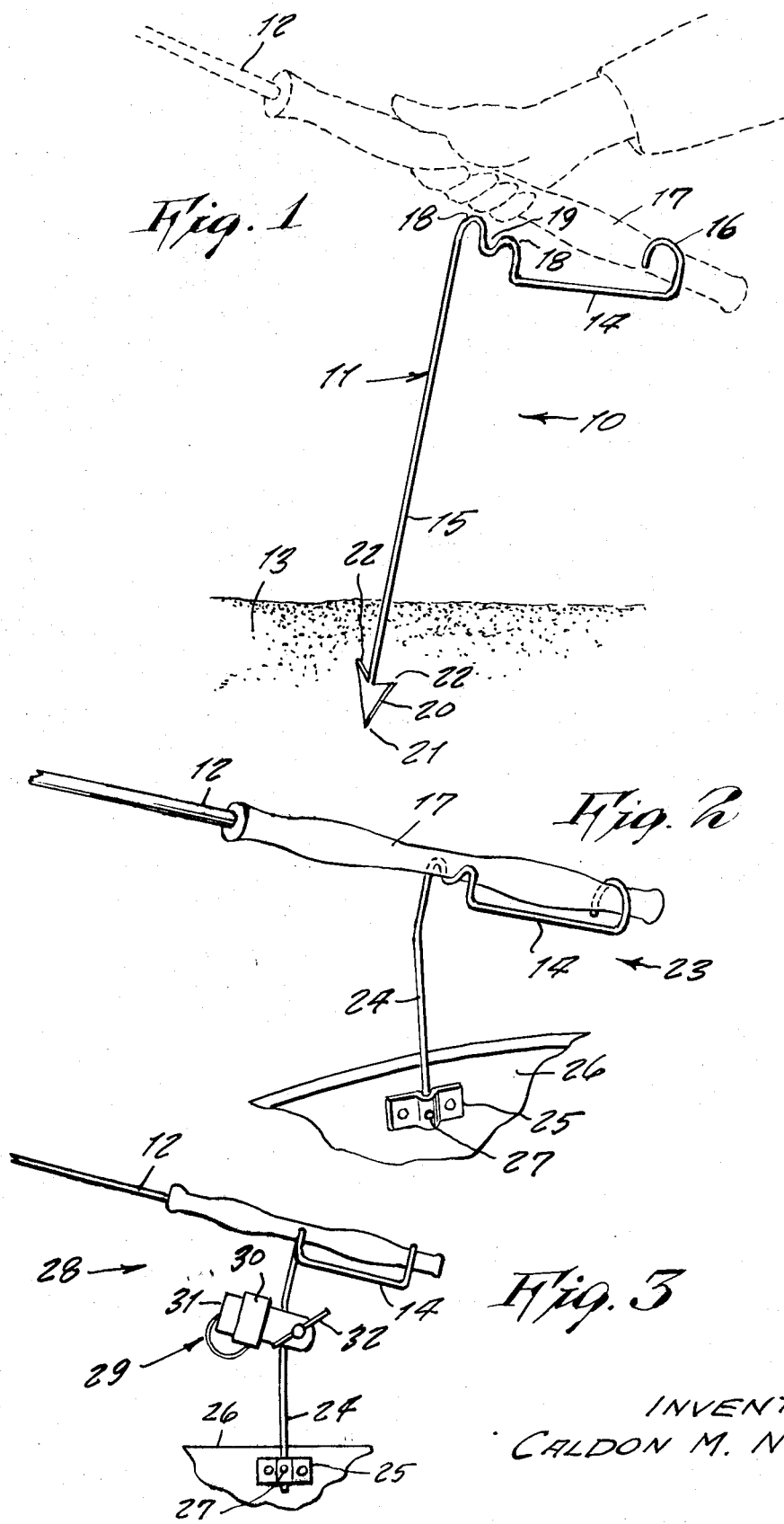

FISHING POLE HOLDER

This invention relates generally to fishing pole holders.

A principal object of the present invention is to provide a fishing pole holder having self contained means so that the fisherman can support his fishing pole thereupon while leaving his hands free for other tasks such as baiting hooks and doing other chores.

Another purpose of the present invention is to provide a fishing pole holder which supports the fishing pole in opposite position for fishing.

Another purpose of the present invention is to provide a fishing pole holder which includes a novel fishing pole support so that the fisherman does not have to pull the fishing pole forwardly to retract it or push it rearwardly to mount it on the device but wherein he simply lifts the pole upwardly in a simple manner or simply lays it down for use.

In another object of the present invention is to provide a fishing pole holder which can be designed readily for insertion into the ground or which can be made adaptable for fitting into a boat.

Other objects of the present invention are to provide a easy out fishing pole holder which is simple in design, inexpensive to manufacture, rugged in construction, easy to use and efficient in operation.

These and other objects will be readily evident upon a study of the following specification and accompanying drawing wherein;

FIG. 1 is a perspective view of the present invention showing one form of the invention adaptable for supporting a fishing pole above the ground, FIG. 2 is a perspective view of a modified design of the invention which is adaptable for mounting in a boat, and FIG. 3 is a side elevation view of a modified design thereof and which is adaptable for also supporting an extra unit.

Referring now to the drawing in detail, the reference numeral 10 represents an easy out fishing pole holder according to the present invention wherein there is a one piece member 11 comprised of heavy metal wire or metal rod of generally rigid character and which is configurated by being formed or bent so as that at one end thereof it can support a fishing rod 12 while at the other end thereof it can be supported by being stuck into the ground 13.

The one piece member 11, accordingly includes a generally horizontally extending arm 14 at one end thereof at one end which is at a right angle generally to a vertically extending post 15 formed at the other end thereof. The arm 14 is bent so as to form an inverted hook 16 at the terminal end thereof so that it can be fitted over the upper side of the rear end of the fishing rod handle 17. The forward portion of the arm 14 has a pair of upwardly extending loops 18 having a downwardly extending saddle 19 therebetween and within which an upper or forward portion of the handle 17 can be seated. The post 15 forming the other end of the member is generally straight and has a latent terminal end that is configurated into an arrow head 20 with a point 21 at the lower end thereof so that the same may be easily inserted downwardly into the ground 13. The arrow head 20 has a pair of sidewardly extending flukes 22 which prevent the post from rotating when inserted in the ground and thereby assuring that the fishing rod is pointed and maintained in the proper direction during its operation.

In operative use, as shown in FIG. 1, the holder 10 is inserted in the ground as shown and the fishing rod 12 is then simply placed upon it. The rear end of the handle is simply inserted under the inverted hook 16 and the fishing rod is then simply allowed to fall until the forward portion of the handle rests upon the saddle 19. Due to the greater weight of the fishing rod being at the forward end thereof, it will therefore not fall off the holder. It is to be noted that there is no obstacle on the holder to prevent the fisherman from lifting the pole outwardly from the holder and the construction makes it very easy for him to simply drop it into place.

In FIG. 2 of the drawing there is shown a modified design of easy out fishing pole holder 23 which includes the same arm features as above described but wherein the lower end of the post, 24 does not have an arrow head so that the same may be inserted into the ground but wherein the lower end thereof is inserted into a bracket 25 mounted upon the side of a fishing boat or rowboat 26, the post 24 being prevented from rotating or slipping downwardly into the bracket by means of a set screw 27 threadingly engaged in the bracket and the end of the set screw bearing against the side of the post 24. It would thus be evident that the form of the invention, the post can be raised or lowered adjustably in the bracket to a desired elevation, and the device may be directionally positioned before the set screw 27 is tightened so that it will be maintained pointing in the desired direction for supporting the fishing rod.

In FIG. 3 of the drawing there is shown another modified design 28 of easy out fishing pole holder 28 which is generally identical to the easy out fishing pole holder 23 but which additionally includes the unit 29 mounted thereupon. The unit 29 includes a holder 30 containing a flashlight 31 which may be used in night fishing, the device being secured upon the post by means of a clamp 32.

What I now claim is:

1. In a fishing pole holder, the combination of a one piece member, said one piece member being made of relatively stiff heavy wire or steel rod, said one piece member being bent to have a generally horizontally extending arm at one end thereof and a generally vertically extending post at the opposite end thereof, said arm having self contained means for supporting thereupon a fishing rod, and the opposite end of said rod being adapted for being supported, and said post being bent at an intermediate portion thereof so that a lower end of said post may be supported directly vertically while the upper end of said post is slightly inclined for holding said fishing rod at an angle during a fishing operation, said arm having an inverted hook formed at the terminal end thereof, the opposite end of said arm having a pair of upwardly extending hooks between which there is a downwardly extending saddle, said inverted hook being adaptable for having a rear end of a fishing rod handle inserted therein while the forward portion of said fishing rod handle is seated upon said saddle.

2. The combination as set forth in claim 1 wherein a lower portion of said post is inserted into a bracket, said bracket adapted to be mounted upon a side of a boat, and said bracket having a set screw threadingly engaged in said bracket, the end of said thread screw bearing against a side of a lower portion of said post carried by said bracket.

3. The combination as set forth in claim 2 wherein said post supports a flashlight unit at an intermediate portion.

* * * * *